(12) United States Patent
Momose et al.

(10) Patent No.: US 8,971,552 B2
(45) Date of Patent: Mar. 3, 2015

(54) ELECTRONIC DEVICE

(75) Inventors: Hideaki Momose, Yokohama (JP); Honkai Tomimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 13/009,443

(22) Filed: Jan. 19, 2011

(65) Prior Publication Data

US 2011/0188676 A1    Aug. 4, 2011

(30) Foreign Application Priority Data

Feb. 2, 2010  (JP) .................................. 2010-021166
Feb. 3, 2010  (JP) .................................. 2010-022091

(51) Int. Cl.
     *H04R 3/00*    (2006.01)

(52) U.S. Cl.
     CPC ........................................ *H04R 3/00* (2013.01)
     USPC ............................. 381/122; 396/535; 381/361

(58) Field of Classification Search
     CPC .......... G03B 7/00; G03B 17/00; G03B 17/02; G03B 19/00; G03B 19/02; G03B 19/18
     USPC ......... 381/122, 111, 150, 355, 361, 365, 368, 381/386, 189; 348/207.99, 373, 375; 396/176, 535; 379/428.01, 430, 379/433.01, 433.03
     See application file for complete search history.

(56) References Cited

U.S. PATENT DOCUMENTS

| | | | | |
|---|---|---|---|---|
| 6,118,666 A | * | 9/2000 | Aoki et al. | ..................... 361/749 |
| 6,360,060 B1 | * | 3/2002 | Tsuchida | ....................... 396/176 |
| 7,248,903 B2 | * | 7/2007 | Yoda | ........................... 455/575.1 |
| 7,751,696 B2 | * | 7/2010 | Tatamiya | ........................ 396/25 |
| 2004/0208311 A1 | * | 10/2004 | Igarashi et al. | ........... 379/406.01 |
| 2005/0179813 A1 | * | 8/2005 | Fujii et al. | ...................... 348/375 |
| 2007/0054521 A1 | * | 3/2007 | John | ............................... 439/136 |

FOREIGN PATENT DOCUMENTS

| | | |
|---|---|---|
| JP | 62-203549 UA | 12/1987 |
| JP | 09-271090 | 10/1997 |
| JP | 11-074955 A | 3/1999 |
| JP | 2005-252945 | 9/2005 |
| JP | 2006-186738 A | 7/2006 |
| JP | 2008-028649 A | 2/2008 |

OTHER PUBLICATIONS

The above references were cited in a Oct. 8, 2013 Japanese Office Action, which is enclosed without an English Translation, that issued in Japanese Patent Application No. 2010-022091.

* cited by examiner

*Primary Examiner* — Davetta W Goins
*Assistant Examiner* — Oyesola C Ojo
(74) *Attorney, Agent, or Firm* — Cowan, Liebowitz & Latman, P.C.

(57) ABSTRACT

An electronic device capable of improving the ease of assembling a speaker and a microphone and ensuring the sound insulation for the speaker and microphone with a less number of parts. When the electronic device is assembled, a protrusion portion of the holding member and an elastic member disposed on an upper surface of the speaker are brought in close contact with an upper plate portion of a front cover, whereby a space defined by the protrusion portion, an upper surface of the microphone, and a microphone hole formed surface of the upper plate portion and a space defined by the elastic member, the upper surface of the speaker, and a speaker hole formed surface of the upper plate portion are each isolated and shielded from another space defined inside of the front cover.

8 Claims, 10 Drawing Sheets

ELECTRONIC DEVICE

BACKGROUND OF THE INVENTION

1. Field of the Invention

The present invention relates to an electronic device, such as a digital camera or a cellular phone, which is provided with a speaker and a microphone.

2. Description of the Related Art

Conventionally, an electronic device provided with a speaker and a microphone is known, and some electronic device of this type is configured to hold the speaker and the microphone by a holder.

For example, Japanese Laid-open Patent Publication No. H9-271090 discloses a parts holder that has a microphone holding portion and a speaker holding portion, which are integrally formed together. With the parts holder, the microphone and the speaker can be held so as not to be detached easily from the parts holder and can be mounted at a time on a body of the electronic device through the parts holder, whereby the ease of assembling can be improved.

With the parts holder disclosed in Japanese Laid-open Patent Publication No. H9-271090, although the ease of assembling is improved, sound insulation for the speaker and microphone cannot be ensured. Accordingly, additional separate sound insulation parts other than the parts holder are required to ensure the sound insulation for the speaker and microphone, resulting in a problem of increase in the number of parts, in costs, and in the man-hours required for assembly.

In particular, in a case that the speaker and the microphone are disposed close to each other as with a small-sized image pickup apparatus, relevant parts are largely affected by each other in an assembled state due to fabrication errors and/or assembly errors thereof, which makes it difficult to ensure the sound insulation for the speaker and microphone.

Usually, cables or a flexible printed circuit board is used for the wiring for the speaker and microphone. However, in a case that cables are used for the wiring, noise from the speaker or from the outside tends to be superimposed on an output signal of the microphone. In a case that a flexible printed circuit board is used, it is necessary to dispose an output signal line of the microphone on one surface of a double-sided flexible printed circuit board and dispose a ground (GND) pattern on another surface thereof in order to prevent noise from being superimposed on the output signal of the microphone, causing increase in costs.

As with an audio device disclosed in Japanese Laid-open Patent Publication No. 2005-252945, it is possible to prevent noise from being superimposed on the output signal of the microphone by using a differential amplifier, but the use of the differential amplifier results in increased costs.

SUMMARY OF THE INVENTION

The present invention provides an electronic device capable of improving the ease of assembling a speaker and a microphone to a holding member and capable of ensuring sound insulation for the speaker and the microphone with a less number of parts.

The present invention also provides an electronic device capable of improving the ease of assembling a speaker and a microphone to a holding member and capable of preventing noise from being superimposed on an output signal of the microphone at low costs.

According to a first aspect of this invention, there is provided an electronic device having a speaker, a microphone, and an exterior member formed with a speaker hole and a microphone hole, which comprises a holding member configured to integrally hold the speaker and the microphone and configured to be fixed to the exterior member so as to dispose the held speaker in alignment with the speaker hole and dispose the held microphone in alignment with the microphone hole, a protrusion portion formed on the holding member and configured to be in close contact with the exterior member when the holding member is fixed to the exterior member, to thereby shield a space connecting the microphone with the microphone hole from another space defined inside of the exterior member, and an elastic member configured to shield a space connecting the speaker with the speaker hole from the other space defined inside of the exterior member when the holding member is fixed to the exterior member.

According to a second aspect of this invention, there is provided an electronic device, which comprises a single-sided flexible wiring board configured to be mounted with a speaker and a microphone, and a holding member having a speaker holding portion for holding the speaker and a microphone holding portion for holding the microphone, wherein the holding member is configured that in a state where the single-sided flexible wiring board is folded back, the speaker holding portion holds the speaker and the microphone holding portion holds the microphone, the single-sided flexible wiring board has an output signal line for the microphone, which is disposed adjacent to a signal line for the speaker, and a ground signal line for the microphone is disposed between the output signal line and the signal line.

With this invention, it is possible to improve the ease of assembling the speaker and microphone to the holding member and ensure sound insulation for the speaker and microphone with a less number of parts. It is also possible to improve the ease of assembling the speaker and microphone to the holding member and prevent noise from being superimposed on an output signal of the microphone at low costs.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1:
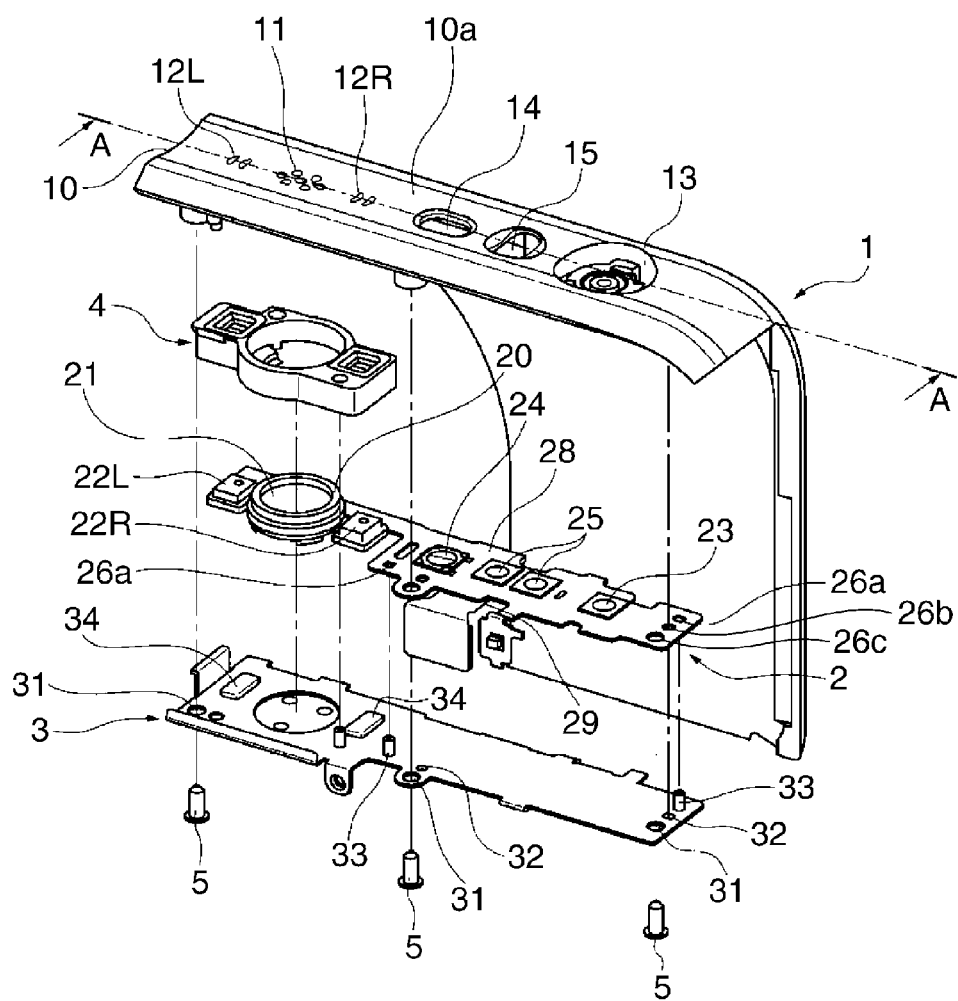
FIG. 1 is a fragmentary exploded perspective view showing an essential part of a digital camera according to a first embodiment of this invention.
Figure 2:
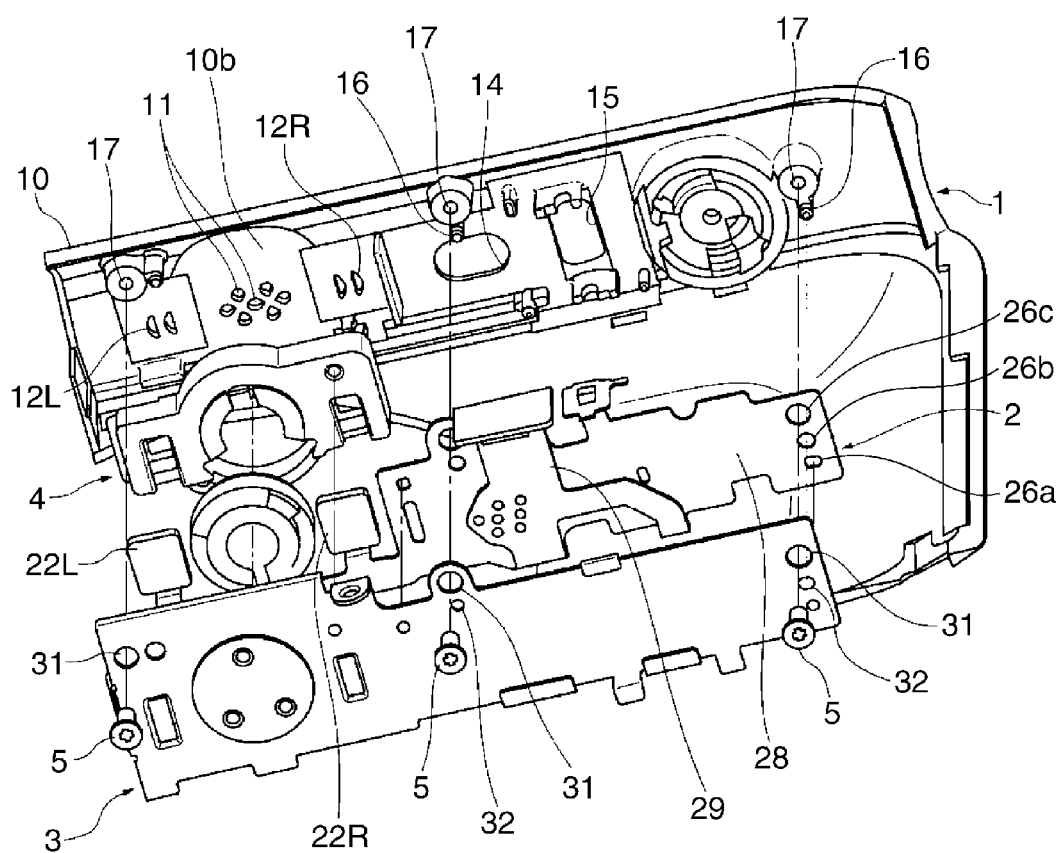
FIG. 2 is a fragmentary exploded perspective view showing the digital camera as seen from below.

FIG. 1 shows in an exploded perspective view an essential part of a digital camera, which is an electronic device according to a first embodiment of this invention, and FIG. 2 shows the camera in an exploded perspective view as seen from below.

As shown in FIGS. 1 and 2, the digital camera of this embodiment includes a speaker 21 and also includes a microphone 22L for left sound input and a microphone 22R for right sound input (hereinafter, referred to as the pair of microphones 22). An exterior member of the camera is partly constituted by a front cover 1.

Usually, the camera is used in a state where an upper plate portion 10 of the front cover 1 is directed upward. In the following, directions toward front and rear surfaces 10a, 10b of the upper plate portion 10 (see, FIG. 6) will be referred to as the upward and downward directions, respectively, and a longitudinal direction of the upper plate portion 10 will be referred to as the left-to-right direction.

In FIGS. 1 and 2, a camera portion where the speaker 21 and the pair of microphones 22 are assembled is mainly shown. A flexible printed circuit board (hereinafter, referred to as the FPC) 2, a stationary plate 3 to which the FPC 2 is fixed, and a holding member 4 are disposed in layer on the rear side of the upper plate portion 10 in the inside of the front cover 1.

The holding member 4 integrally holds the speaker 21 and the microphones 22L, 22R. In this embodiment, the holding member 4 is formed of a rubber material, but this is not limitative. The holding member 4 can be formed of any elastic material having sufficient elasticity.

The upper plate portion 10 of the front cover 1 is formed with a speaker hole 11 through which sound from the speaker 21 is emitted to the outside. Microphone holes 12L, 12R, through which sounds from the outside are picked up by the microphones 22L, 22R for left and right sound input, are formed on opposite sides of the speaker hole 11 in the left-to-right direction and adjacent to each other. The speaker hole 11 and the microphone holes 12L, 12R are opened to the front surface 10a of the upper plate portion 10, i.e., opened to the same surface of the upper plate portion 10.

The upper plate portion 10 of the front cover 1 is formed with a recess 13 into which a release button (not shown) for operating a release switch 23 is assembled. When the release button is half-pressed, a photographing preparation operation (such as light measurement operation and focus adjustment operation) is started. When the release button is full-pressed, a photographing operation for exposure of an image pickup element such as a CCD (not shown) is started. Further, the upper plate portion 10 is formed with mounting holes 14, 15 into which a power button (not shown) for turning a power switch 24 on and off and a zoom lever (not shown) for operating a zoom switch 25 are respectively mounted.

As shown in FIG. 2, bosses each formed with a screw fastening hole 17 are protrudingly formed at three places and protrusions 16 for positioning the stationary plate 3 are formed at two places on the rear surface 10b of the upper plate portion 10.

As shown in FIG. 1, the speaker 21, microphones 22L, 22R, release switch 23, power switch 24, and zoom switch 25 are mounted on the FPC 2. The FPC 2 is electrically connected to a main wiring board 6 (see, FIG. 7), described later. The release switch 23 and the zoom switch 25 are each implemented by a two-stage switch. The microphones 22L, 22R are disposed on the left and right sides of the speaker 21. The microphones 22L, 22R are paired to form a stereophonic microphone where they are for the left and right channels. The FPC 2 is formed with positioning holes 26a into which pin crimp portions 33 of the stationary plate 3 are inserted, a positioning hole 26b into which the protrusion 16 of the upper plate portion 10 is inserted, and a hole 26c into which a screw 5 is inserted.

The speaker 21 and the microphones 22L, 22R are respectively aligned in position with the speaker hole 11 and the microphone holes 12L, 12R formed in the upper plate portion 10 of the front cover 1. The power switch 24, zoom switch 25, and release switch 23 are respectively aligned in position with the holes 14, 15 and the recess 13 formed in the upper plate portion 10.

As shown in FIG. 1, the stationary plate 3 is formed with screw through holes 31, positioning through holes 32, pin crimp portions 33, and two drawn convex portions 34 that protrude upwardly. The screw through holes 31 and the positioning through holes 32 are formed in alignment with the screw fastening holes 17 and the protrusions 16 formed in the upper plate portion 10 of the front cover 1. The pin crimp portions 33 and the drawn convex portions 34 are formed in alignment with the positioning holes 26a formed in the FPC 2 and the microphones 22L, 22R mounted on the FPC 2.

Next, a description will be given of an assembly structure and assembly method of the FPC 2 and the holding member 4.

Figure 3:
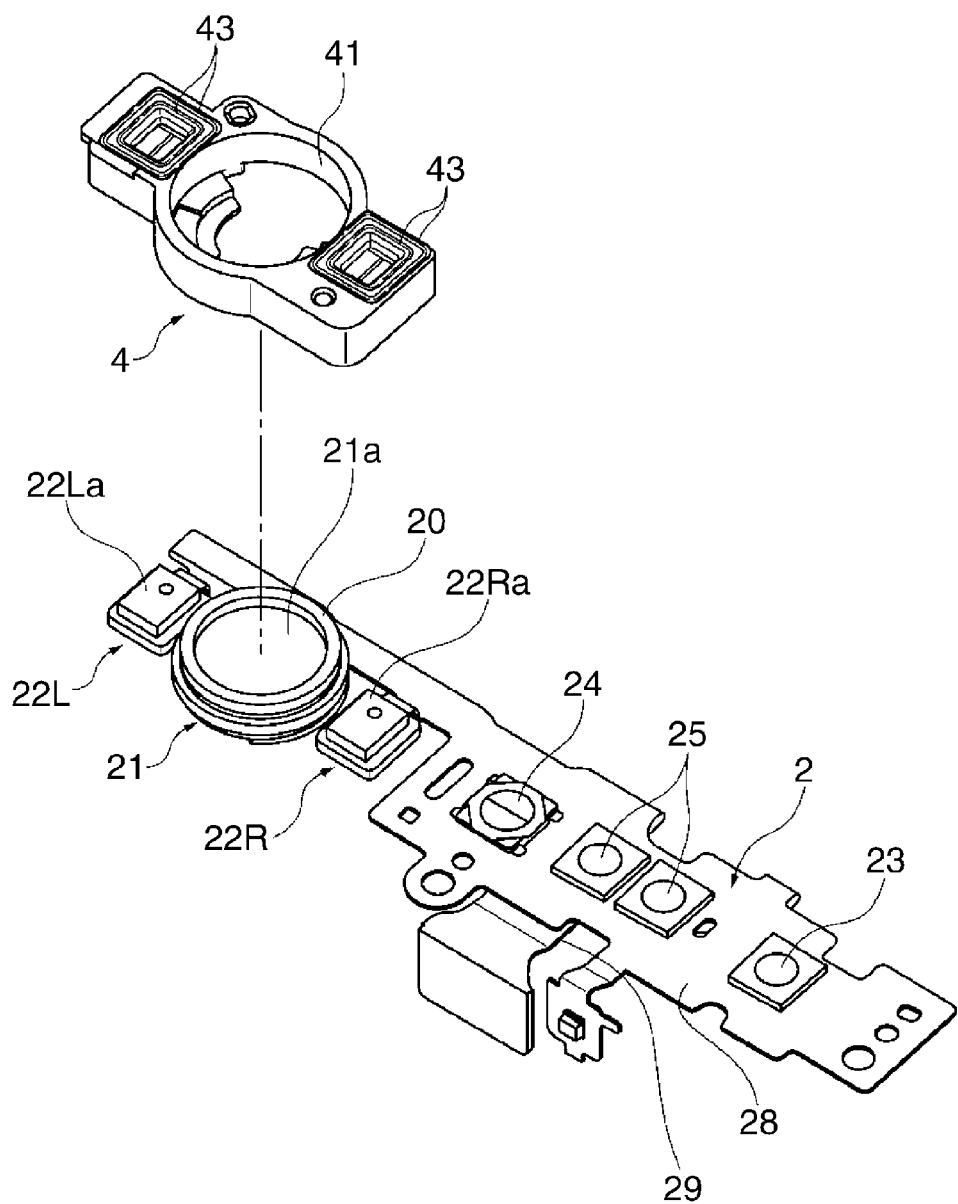
FIG. 3 is an exploded perspective view showing an FPC and a holding member of the digital camera.
Figure 4:
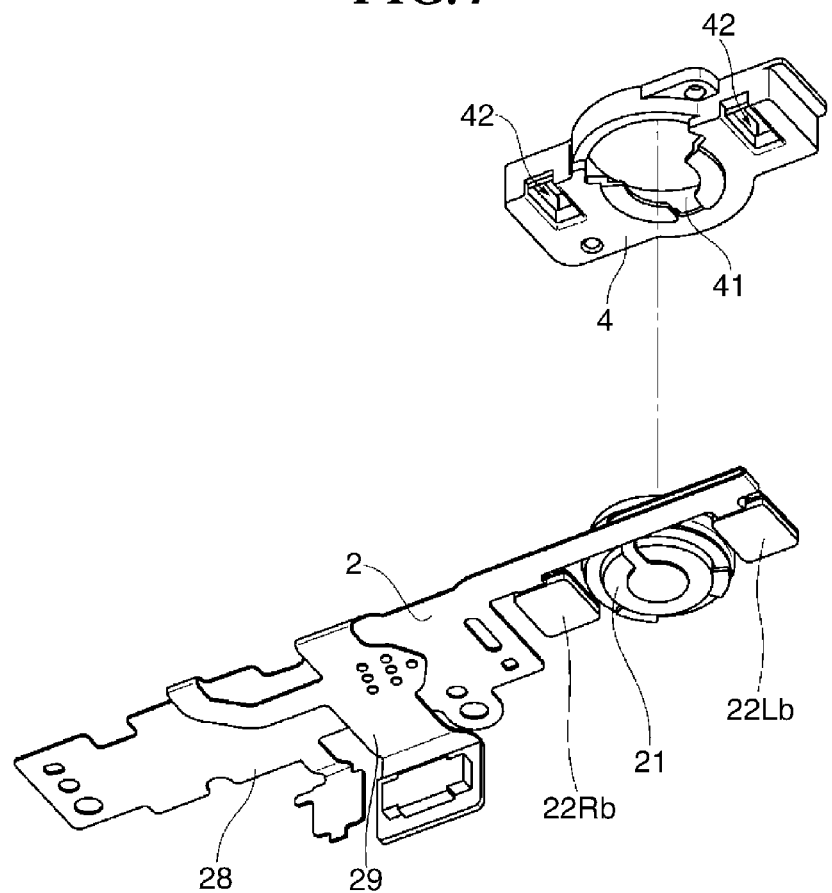
FIG. 4 is an exploded perspective view showing the FPC and the holding member as seen from below.
Figure 5:
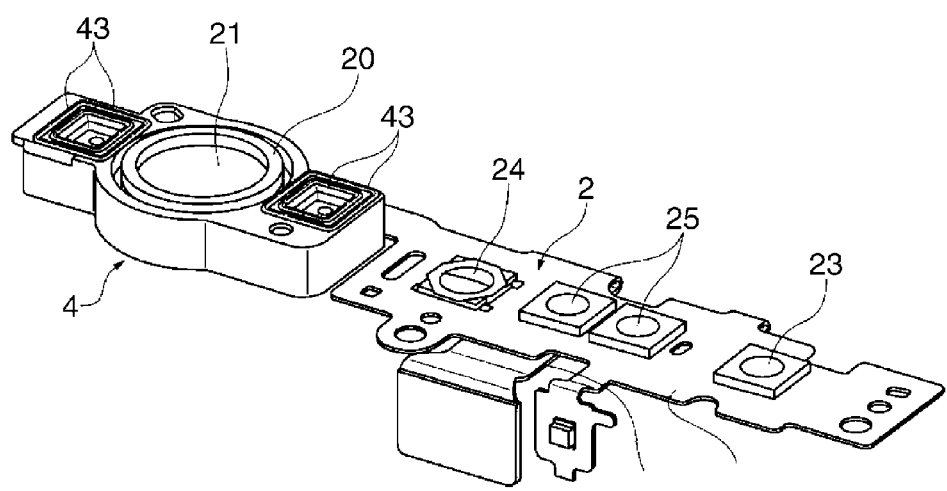
FIG. 5 is a perspective view showing the FPC in a state assembled to the holding member.

FIG. 3 shows in perspective view the FPC 2 mounted with the speaker 21 and the microphones 22L, 22R in a state before being assembled to the holding member 4. FIG. 4 shows the FPC 2 and the holding member 4 in perspective view as seen from below, and FIG. 5 shows in perspective view the FPC 2 in a state assembled to the holding member 4.

The FPC 2 is implemented by a single-sided mounting type of printed circuit board, and is comprised of a plate portion 28 on which the speaker 21 and the microphones 22L, 22R are mounted and a bent portion 29 which is bent relative to the plate portion 28. The speaker 21 is disposed such that a sound output surface thereof is directed upward, and the microphones 22L, 22R are disposed such that sound input surfaces thereof are directed upward.

A cylindrical elastic member 20, which is an additional separate member other than the holding member 4, is fixed (e.g., affixed) to an upper portion of the speaker 21. The elastic member 20 is formed of an elastic material, preferably formed of an elastic material having high shock absorption such as, for example, PORON (registered trademark). The elastic member 20 can be formed of the same material as that of the holding member 4, but preferably formed of a material having hardness different from that of the holding member 4.

On the holding member 4, there are provided double protrusion portions 43 for L and R channels, each of which is formed into a square annular shape in plan so as to surround the periphery of the sound input surface of the corresponding one of the microphones 22L, 22R.

The holding member 4 is formed with a speaker receiving hole 41 (speaker holding portion) and microphone receiving holes 42 (microphone holding portions). The speaker 21 and the microphones 22L, 22R are assembled to the holding member 4 by being pushed into respective ones of the receiving holes 41, 42 from below.

An assembly shown in FIG. 5 can be obtained by assembling the speaker 21 and the microphones 22L, 22R to the holding member 4.

Next, the holding member 4 is assembled to the FPC 2, and then the FPC 2 is assembled to the stationary plate 3. At that time, as shown in FIGS. 1 and 2, the bent portion 29 of the FPC 2 is bent relative to the plate portion 28 of the FPC 2 on which the holding member 4 is mounted, and the stationary plate 3 is sandwiched by the plate portion 28 and the bent portion 29 from above and below. Further, the pin crimp portions 33 of the stationary plate 3 are inserted into the positioning holes 26a formed in the FPC 2, whereby the stationary plate 3 and the FPC 2 are positioned to each other. The FPC 2 and the stationary plate 3 are fixed using a double-faced tape, not shown.

Next, the assembly of the FPC 2 and the stationary plate 3 is assembled to the upper plate portion 10 of the front cover 1. At that time, the protrusions 16 of the upper plate portion 10 are inserted into the through hole 26b of the FPC 2 and the positioning through holes 32 of the stationary plate 3. The front cover 1 and the stationary plate 3 are positioned to each other by the engagement between the protrusions 16 and the positioning through holes 32.

Next, three screws 5 are inserted into the screw through holes 31 of the stationary plate 3 and the screw through hole 26c of the FPC 2 from below of the stationary plate 3 and are threadedly engaged with the screw fastening holes 17 formed in the upper plate portion 10 of the front cover 1, whereby the assembly of the stationary plate 3 and the FPC 2 to which the holding member 4 has been assembled is fixed to the front cover 1.

Figure 6:
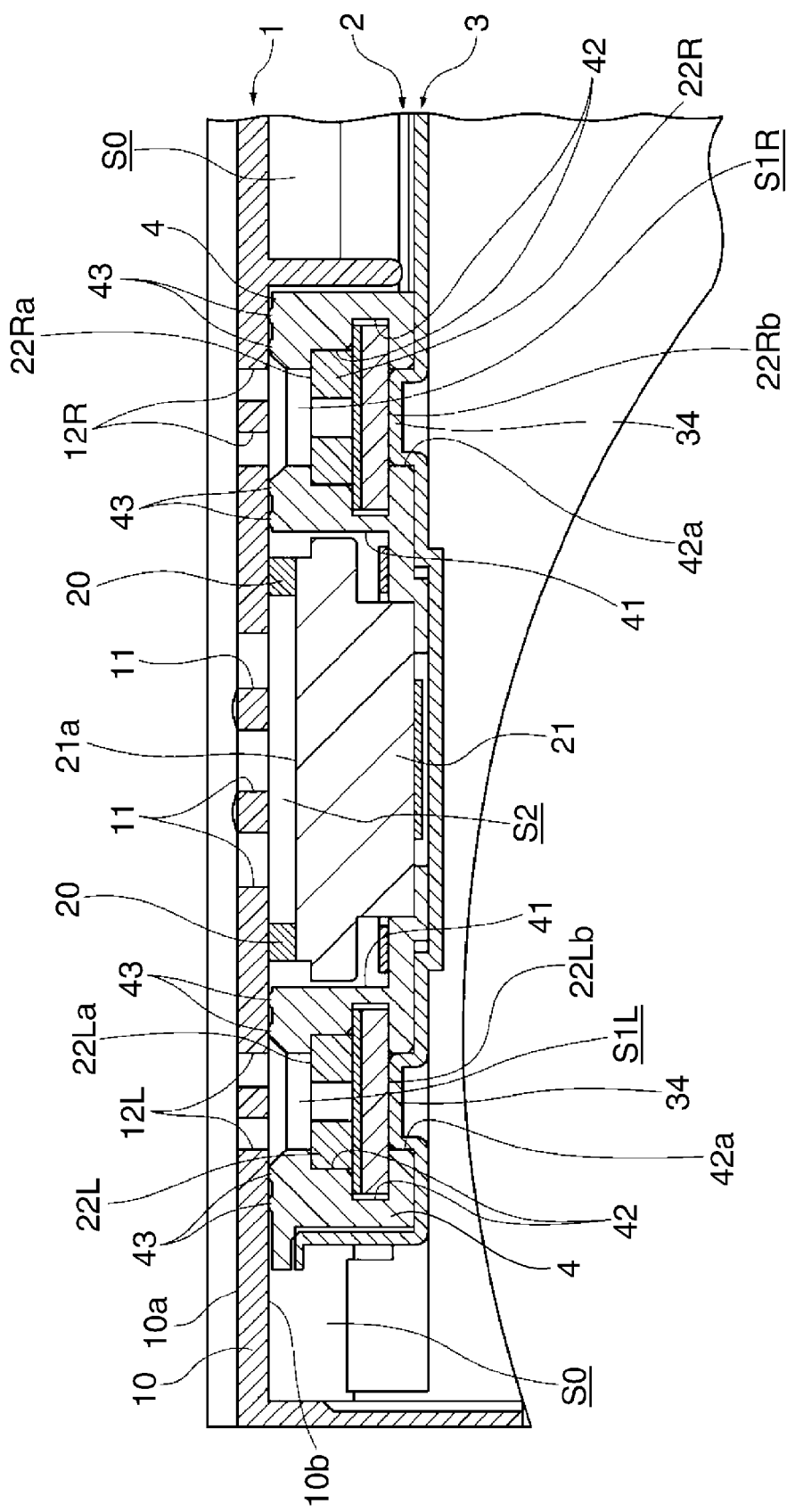
FIG. 6 is a fragmentary section view, taken along line A-A in FIG. 1, showing an assembly of the stationary plate and the FPC, to which the holding member has been assembled, in a state assembled to a front cover of the camera.

FIG. 6 shows in section view an essential part of the assembly of the stationary plate 3 and the FPC 2, to which the holding member 4 has been assembled, in a state assembled to the front cover 1.

In the assembly of the FPC 2 and the stationary plate 3, the speaker 21 is held in the speaker receiving hole 41 formed in the holding member 4. The microphone receiving holes of the holding member 4 are formed as stepped holes, and the microphones 22L, 22R are held in upper portions of the stepped microphone receiving holes 42. Thus, the speaker 21 and the pair of microphones 22 are integrally held, while being surrounded by the holding member 4.

In the assembly of the FPC 2 and the stationary plate 3, the elastic member 20 projects upwardly from the speaker receiving hole 41 of the holding member 4, and the protrusion portions 43 of the holding member 4 are disposed on the side of the upper plate portion 10 of the front cover 1. When the assembly of the FPC 2 and the stationary plate 3 is assembled to the front cover 1, the elastic member 20 and the holding member 4 are pressed against the rear surface 10b of the upper plate portion 10 of the front cover 1. The elastic member 20 and the protrusion portions 43 of the holding member 4, which are formed of an elastic material such as a rubber material, are deformed and brought in close contact at their entire circumferences with the rear surface 10b of the upper plate portion 10, as shown in FIG. 6.

As a result, a space S1L, which is defined by the microphone hole 12L formed portion of the upper plate portion 10, the upper surface 22La of the microphone 22L, and the microphone receiving hole 42 formed portion of the holding member 4, is isolated and shielded from a space S0 defined inside of the front cover 1. Further, a space S1R, which is defined by the microphone hole 12R formed portion of the upper plate portion 10, the upper surface 22Ra of the microphone 22R, and the microphone receiving hole 42 formed portion of the holding member 4, is also isolated and shielded from the space S0 defined inside of the front cover 1. It is therefore possible to ensure the sound insulation for the microphones 22. In particular, since the double protrusion portions 43 are provided (i.e., the protrusions 43 are of double structure), highly close contact can be attained between the protrusion portions 43 and the front cover 1 and the sound input property of the microphones 22 can be improved.

In this embodiment, the protrusion portions 43 are configured to have a double structure, but this is not limitative. The protrusion portions 43 can be configured to have any structure that can ensure the contact with the front cover 1. For example, the protrusion portions can be configured to have a single structure having a broad ridge width or to have a triple or more structure.

When the holding member 4 is assembled to the FPC 2, the microphones 22L, 22R are held in the microphone receiving holes 42, as described above, whereby the drawn convex portions 34 of the stationary plate 3 are brought in abutment with the lower surfaces 22Lb, 22Rb of the microphones 22L, 22R, and lower openings 42a of the microphone receiving holes 42 are closed (see FIG. 6). As a result, the microphones 22L, 22R are prevented from picking up sounds generated in the inside of the camera.

Figure 7:
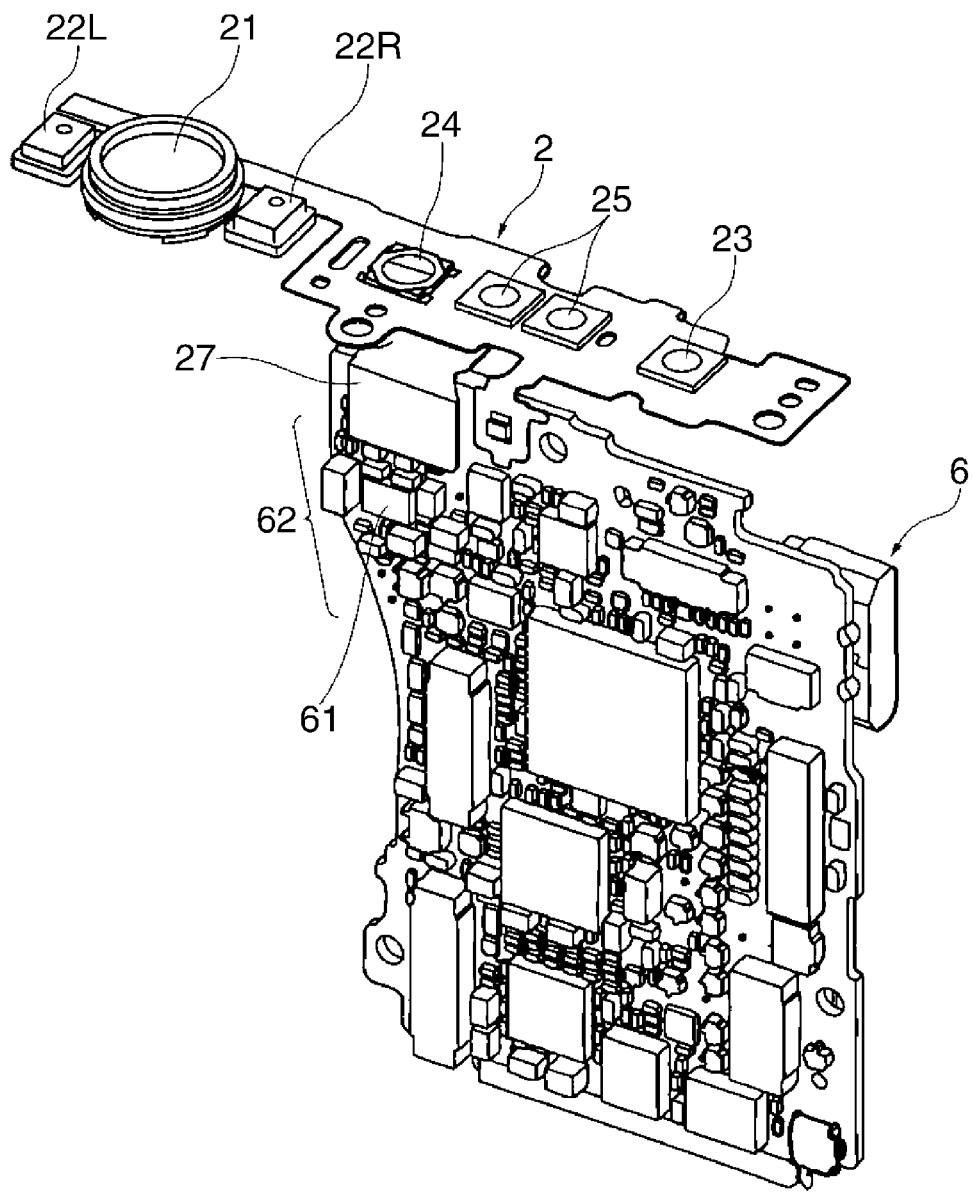
FIG. 7 is a view showing connection between the FPC and a main wiring board.

FIG. 7 shows connection between the FPC 2 and the main wiring board 6.

As shown in FIG. 7, an audio circuit block 62 including an audio IC 61 is mounted on the main wiring board 6, and the main wiring board 6 is connected to the FPC 2 by an inter-board connector 27. The audio circuit block 62 includes a microphone amplifier for amplifying electrical signals output from the microphones 22L, 22R that pick up sounds.

In the audio circuit block 62, an analog electrical signal output from the microphone amplifier is converted by an A/D converter into a digital signal, which is recorded as sound data. The digital signal from the A/D converter is processed and converted in a sound signal processor, and the resulting digital signal is converted by a D/A converter into an analog signal. The analog signal from the D/A converter is amplified by a sound output amplifier and then output from the speaker 21 or from an audio cable, not shown.

The microphones 22L, 22R are silicon microphones and mounted on the FPC 2. Terminals of the microphones are solder connected to a pattern formed on the FPC 2.

In this embodiment, the FPC 2 is implemented by a single-sided flexible wiring board that has a copper pattern disposed on a polyimide base film and having a surface thereof covered by a polyimide cover lay. The single-sided flexible wiring board is folded back at a fold-back position between a speaker mounting portion and a microphone mounting portion of the wiring board, whereby the speaker 21 is disposed between the left and right microphones 22L, 22R.

Figure 8:
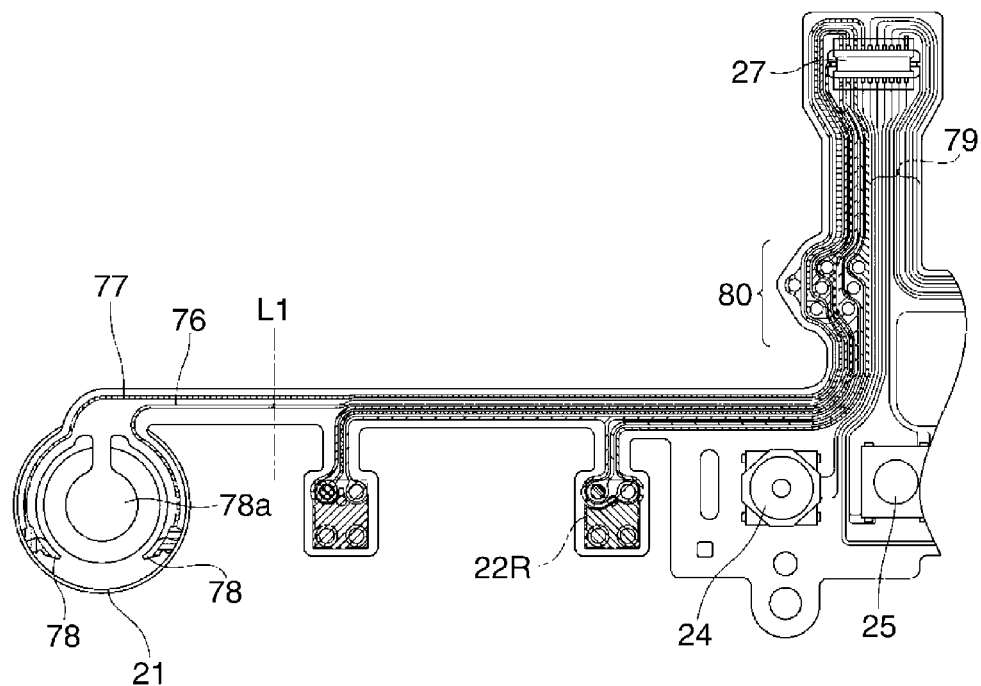
FIG. 8 is a view showing the wiring on the FPC.
Figure 9:
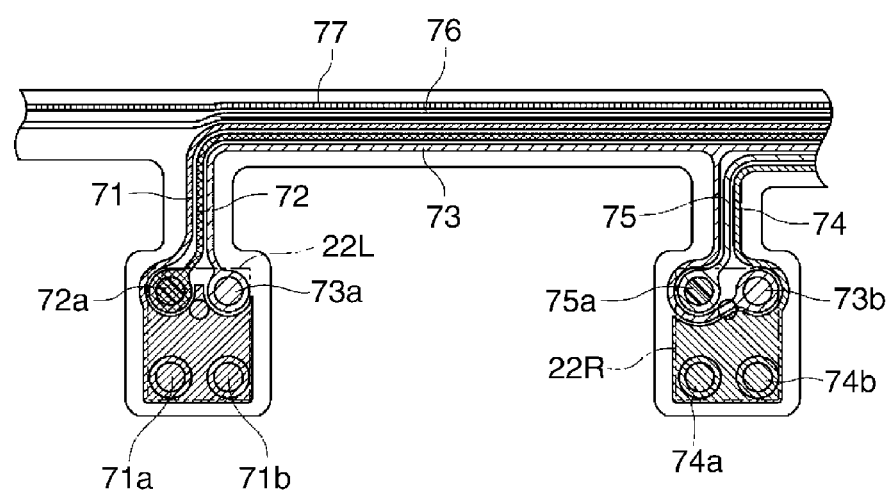
FIG. 9 is an enlarged view showing the wiring on a microphone mounting portion of the FPC.

In the following, a more specific description will be given of the FPC 2. FIG. 8 shows the FPC 2 in a state before being folded back at the fold-back position between the speaker mounting portion and the microphone mounting portion, and FIG. 9 shows in enlarged view the microphone mounting portion of the FPC 2 shown in FIG. 8.

As shown in FIG. 8, before the FPC 2 is folded back, the speaker 21 and the left and right microphones 22L, 22R are mounted on the FPC 2 in this order. In that state, the FPC 2 is folded back at, e.g., a position L1 between the speaker 21 mounting portion and the left microphone 22L mounting portion, whereby the speaker 21 is disposed between the left and right microphones 22L, 22R, and the sound output surface of the speaker 21 and the sound input surfaces of the microphones 22L, 22R are directed toward the same direction.

To assemble the speaker 21 and the microphones 22L, 22R to the holding member 4, the microphones 22L, 22R are assembled to the holding member 4, and then the speaker 21 is assembled to the holding member 4 after the FPC 2 is folded back.

Specifically, before the FPC 2 is folded back, the microphones 22L, 22R are assembled to the holding member 4 by pushing the microphones into the left and right microphone receiving holes 42 from below of the holding member 4. Subsequently, the FPC 2 is folded back at, e.g., the position L1, and the speaker 21 is assembled to the holding member 4 by pushing the speaker 21 into the speaker receiving hole 41 from below of the holding member 4. By adjusting the foldback position L1 of the FPC 2 according to the position of the speaker receiving hole 41, the assembly efficiency can be improved as compared to a case where the speaker 21 and the microphones 22L, 22R are assembled to the holding member 4 at a time, and disconnection in the FPC 2 can be prevented from occurring.

The FPC 2 is soldered to an outer peripheral portion 78 of the rear surface of the speaker 21, and affixed to a central portion 78a of the rear surface of the speaker 21 using, e.g., a double-faced tape, whereby stress acting on the soldered portion 78 of the FPC 2 can be reduced, even if a load is applied to the speaker 21 when the speaker 21 is subsequently assembled to the holding member 4.

Next, with reference to FIGS. 8 and 9, an example of wiring on the FPC 2 will be described.

Referring to FIG. 9, output signal lines 72, 75 of the FPC 2 are respectively solder connected to output signal terminals 72a, 75a of the left and right microphones 22L, 22R. GND signal lines (ground signal lines) 71, 74 of the FPC 2 are respectively solder connected to GND signal terminals 71a, 71b of the left microphone 22L and to GND signal terminals 74a, 74b of the right microphone 22R. Wirings of these GND signal lines 71, 74 are respectively formed on the entire lower surfaces of the left and right microphones 22L, 22R, whereby intrusion of noise from the outside is prevented.

A power signal line 73 is solder connected to power signal terminals 73a, 73b of the left and right microphones 22L, 22R. In this embodiment, the power signal line 73 is a power supply line common to the left and right microphones 22L, 22R and wired between the output signal lines 72, 75 of the microphones 22L, 22R. As a result, the wiring on the single-sided flexible wiring board can easily be performed and output signals from the microphones 22L, 22R can be prevented from affecting from each other. Since the power signal line can be shared in the single-sided flexible wiring board, the number of pins of the inter-board connector 27 used to connect the main wiring board 6 and the FPC 2 can be reduced, resulting in reduction in costs.

A plus side signal line 76 and a minus side signal line 77 of the FPC 2, which are for the speaker 21, are soldered at the soldered portion 78 to the speaker 21. The FPC 2 is affixed to the central portion 78a of the rear surface of the speaker 21 using a double-faced tape, whereby a load is prevented from being applied to the soldered portion 78 of the FPC 2, even if a load is applied to the speaker 21 during the assembly.

In the FPC 2, the GND signal line 71 for the left microphone 22L is disposed between the plus side signal line 76 for the speaker 21 and the output signal line 72 for the left microphone 22L, whereby noise from a speaker signal can be prevented from being superimposed on an output signal of the left microphone 22L.

Referring to FIG. 8, a signal line group 79 for operation system switches of the FPC 2 includes signal lines for the power switch 24, release switch 23, and zoom switch 25, and is disposed adjacent to the output signal line 75 for the right microphone 22R. The GND signal line 74 for the right microphone 22R is disposed between the signal line group 79 for operation system switches and the output signal line 75 for the right microphone 22R, whereby noise such as static electricity noise from the signal line group 79 for operation system switches can be prevented from being superimposed on an output signal of the right microphone 22R.

In a check pad group 80 of the FPC 2, signal lines for the speaker 21 and for the microphones 22L, 22R are each exposed in the form of a circular shape. Each of signals from the speaker 21 and the microphones 22L, 22R can be detected by contacting a probe with a corresponding one of exposed signal lines of the check pad group 80, whereby it is possible to confirm in an assembled state whether there is a disconnection due to a mounting failure. It is also possible to check whether there is a sensitivity difference equal to or larger than a prescribed value between the left and right microphones 22L, 22R by contacting a probe with the check pad group 80. In the case of a camera having plural speakers paired to constitute a stereophonic speaker system, left and right sound pressure levels can be adjusted. The maintenance and adjustment of a camera, if it has a check pad group, can be carried out, without dismantling the camera.

As described above, in this embodiment, the FPC 2 is folded back and the speaker 21 is assembled to the speaker receiving hole 41 formed in the holding member 4 after the microphones 22L, 22R are assembled to the microphone receiving holes 42 of the holding member 4, whereby the assembly efficiency can be enhanced as compared to a case where the speaker 21 and the microphones 22L, 22R are assembled to the holding member 4 at a time.

In this embodiment where the single-sided flexible wiring board is used, the GND signal line 74 is disposed between the operation system switch signal line group 79 and the output signal line 75 of the right microphone 22R and the GND signal line 71 is disposed between the plus side signal line 76 of the speaker 21 and the output signal line 72 of the left microphone 22L, whereby noise is prevented from being superimposed on the output signals of the left and right microphones 22L, 22R at low costs.

It is possible to prevent noise of a signal from the speaker 21 can be prevented from being superimposed on the output signal line 72 for the microphone 22L by disposing the ground signal line 71 for the microphone 22L adjacent to the plus side signal line 76 of the speaker 21 in the FPC 2 where signal lines for the speaker 21 and the microphones 22L, 22R are juxtaposed one another.

It is also possible to prevent the output signals from being affected by each other by wiring the power signal line 73 between the output signal lines 72, 75. Since the power signal line 73 is a power supply line common to the left and right microphones and disposed between the output signal lines 72, 75, the wiring on the single-sided flexible printed circuit board can easily be performed. By sharing the power supply line on the single-sided flexible printed circuit board, the number of pins of the inter-board connector 27 can be reduced, resulting in a reduction in costs.

The wirings of the ground signal lines 71, 74 are respectively formed on the entire lower surfaces of the microphones, whereby noise such as static electricity noise can be prevented from being intruded from the outside, e.g., from the operation system.

During the assembly, the speaker 21 can be disposed between the microphones 22L, 22R by folding the FPC 2 at the fold-back position L1. By configuring the FPC 2 capable of being folded back, some margin is provided to the FPC 2 when the speaker 21 is assembled to the holding member 4, resulting in easy assembly. Further, it is unnecessary to assemble the speaker 21 and the microphones 22L, 22R to the FPC 2 at a time. Specifically, after the microphones 22L, 22R are assembled to the FPC 2, the FPC 2 is folded back and then the speaker 21 can be assembled to the FPC 2. Thus, disconnection in the FPC 2 can be prevented from occurring.

With the FPC 2 configured as described above, the FPC 2 mounted with the speaker 21, etc. can be formed in the form of single-sided flexible printed circuit board, while preventing noise from being superimposed on the output signal lines 72, 75, thereby achieving a reduction in costs and improving the ease of assembling.

In this embodiment, the speaker 21 and microphones 22 are brought in close contact through separate parts (the protrusion portions 43 of the holding member 4 and the elastic member 20) with the rear surface 10b of the upper plate portion 10 of the front cover 1, whereby the speaker 21 and microphones 22 can securely be brought in close contact with the front cover 1, irrespective of how the speaker 21 and microphones 22 are respectively assembled to the holding member 4. In a case where the speaker 21 and microphones 22 are configured to be in close contact through the same part (e.g., holding member 4) with the front cover 1, if, e.g., the microphones 22L, 22R are slantedly mounted, there occurs inconvenience that portions of the holding member 4 around the microphones 22L, 22R and speaker 21 are brought in insufficient contact with the front cover 1.

In this embodiment, the sound insulation for the speaker 21 and microphones 22 is provided by not using an integral part but using separate sound insulation members. The sound insulation members are less affected by one another in an assembled state, even if there are fabrication errors and/or assembly errors. Furthermore, since the speaker 21 and the microphones 22 are shielded by the separate sound insulation members, there is an advantage that vibrations of the speaker 21 and microphones 22 are not conveyed directly therebetween. As a result, the sound insulation for the speaker 21 and microphones 22 can be achieved, irrespective of assembled states of the speaker 21 and microphones 22, whereby improved sound quality can be achieved.

In this embodiment, since the speaker 21 and the microphones 22 are held by the integral holding member 4, man-hours required for assembly can be reduced and the ease of assembling can be improved, as compared to a case where the speaker 21 and microphones 22 are held separately by different members. Since the sound insulation for the microphones 22 are provided by the protrusion portions 43, which are part of the holding member 4, it is unnecessary to use members dedicated to the sound insulation, resulting in a reduction in the number of parts and in costs. Accordingly, the sound insulation properties of the speaker 21 and microphones 22 can be ensured with a less number of parts, while improving the ease of assembling the speaker 21 and microphones 22.

Since the elastic member 20 and the holding member 4 are differentiated in hardness, their deformations generated due to fabrication errors and/or assembly errors become hard to be conveyed between the elastic member 20 and the holding member 4, whereby insufficient contact of the elastic member 20 and the protrusion portions 43 with the front cover 1 is prevented from occurring, so that the ease of assembling and the sound insulation properties of the speaker 21 and microphones 22 can further be improved.

Furthermore, the microphone hole 12L, speaker hole 11, and microphone hole 12R are opened to the upper plate portion of the front surface 10a at locations adjacent to one another, and the microphones 22L, 22R and the speaker 21 are aligned with these holes, with the microphones 22 disposed on opposite sides of the speaker 21. Usually, structural elements, which are disposed close to one another as mentioned above, are largely affected to one another in an assembled state and largely affect on sounds. Accordingly, this invention is particularly advantageous in being used in such arrangement.

Second Embodiment

A second embodiment of this invention is different from the first embodiment in the construction of a part where the protrusion portions 43 of the holding member 4 are abutted against and engaged with the rear surface 10b of the upper plate portion 10 of the front cover 1, but is the same as the first embodiment in other respects. In the following, a description will be given of structural parts different from the first embodiment.

Figure 10:
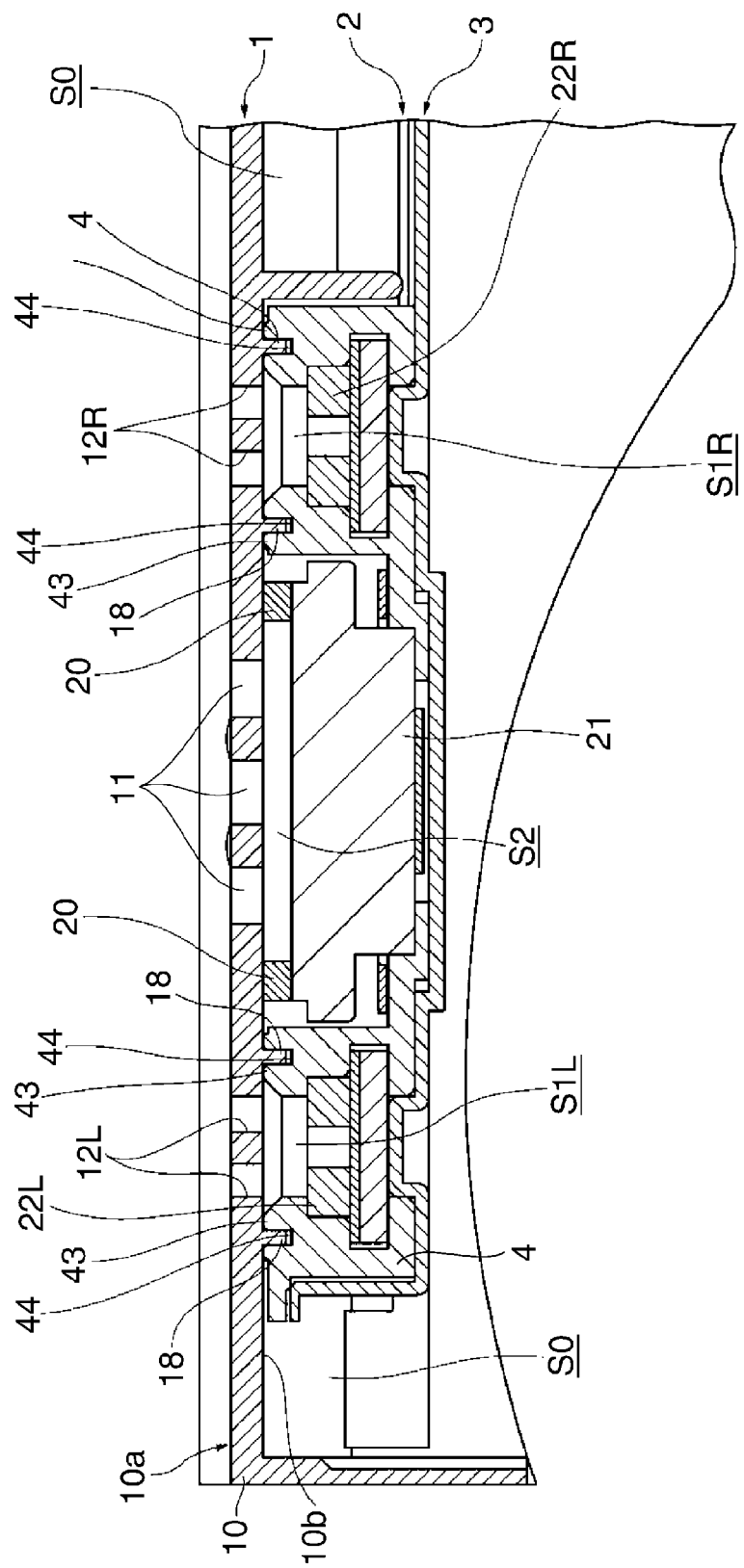
FIG. 10 is a fragmentary section view, taken along line A-A in FIG. 1, showing a digital camera according to second embodiment of this invention in a state where the FPC, stationary plate, and holding member are incorporated to the front cover.

FIG. 10 shows in fragmentary section view a digital camera, which is an electronic device according to the second embodiment, in a state where the FPC 2, stationary plate 3, and holding member 4 are incorporated into the front cover 1.

As shown in FIG. 10, a groove 44 is formed in each of the double protrusion portions 43 to have a depth deeper than that in the first embodiment. The groove 44 is formed along the entire circumference of the protrusion portion 43. Projections 18 are protrudingly formed on the rear surface 10b of the upper plate portion 10 in alignment in position with the grooves 44. The grooves 44 and the projections 18 are each formed into a square annular shape as viewed in plan.

When the FPC 2, stationary plate 3, and holding member 4 are assembled to the front cover 1, so that the protrusion portions 43 are brought in close contact with the rear surface 10b of the upper plate portion, the projections 18 are fitted into respective ones of the grooves 44 formed in the rear surface 10b, whereby the degree of contact of the protrusion portions 43 and grooves 44 against the rear surface 10b of the upper plate portion is enhanced, and accordingly the degree to which the spaces S1L, S1R is shielded is enhanced. It is therefore possible for this embodiment to further improve the sound quality of the microphones 22L, 22R. Since the projections 18 can be formed integrally with the front cover 1, the number of parts does not increase.

It should be noted that in each of the above described embodiments, the double structure of the protrusion portions 43 can also be applied to an upper portion of the elastic member 20, and the structure of the second embodiment where the projections 18 are fitted into the grooves 44 can also be applied to the upper portion of the elastic member 20.

It is not inevitably necessary to fix the elastic member 20 to the speaker 21, but can be interposed between the upper plate portion 10 of the front cover 1 and the speaker 21. For example, the elastic member 20 can be fixed to the rear surface 10b of the upper plate portion 10.

In each of the embodiments, the protrusion portions 43 constituting apart of the holding member 4 are used to ensure the sound insulation for the microphones 22, and the elastic member 20, which is separate from the holding member 4, is used to ensure the sound insulation for the speaker 21, but these are not limitative. For example, conversely to the embodiment, a thickened portion that projects around the speaker 21 can be formed on the holding member 4 and the elastic member can be interposed between the microphones 22 and the upper plate portion 10 of the front cover 1.

In brief, it is enough to shield the space, corresponding to either the microphones 22 or the speaker 21, from the space S0 defined inside of the front cover by using the holding member 4 and to shield the space, corresponding to another of the microphones 22 and the speaker 21, from the space S0 inside of the front cover by using a different elastic member other than the holding member 4.

Insofar as to attain advantages of improving the ease of assembling the speaker 21 and the microphones 22 and ensuring the sound insulation properties thereof with a less number of parts is concerned, the number of speakers 21 and the number of microphones 22 are not limitative. For example, the number of microphones 22 can be one.

Third Embodiment

Figure 11:
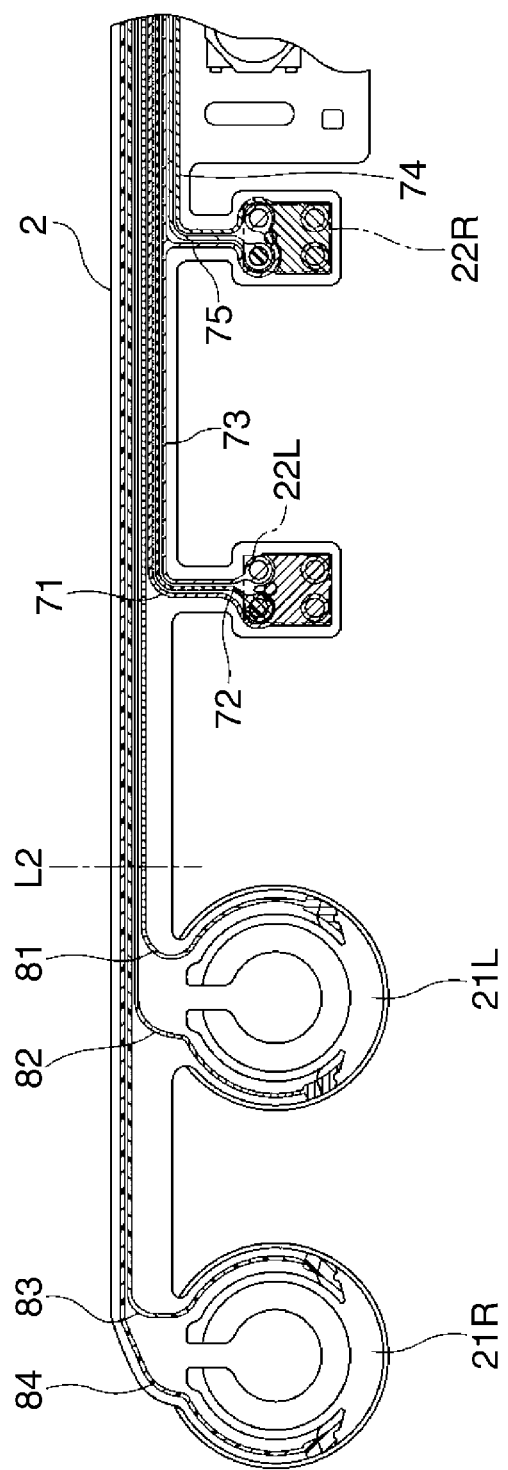
FIG. 11 is a view showing a single-sided flexible wiring board of a digital camera, which is an electronic device according to a third embodiment of this invention, in a state before being folded back.
Figure 12:
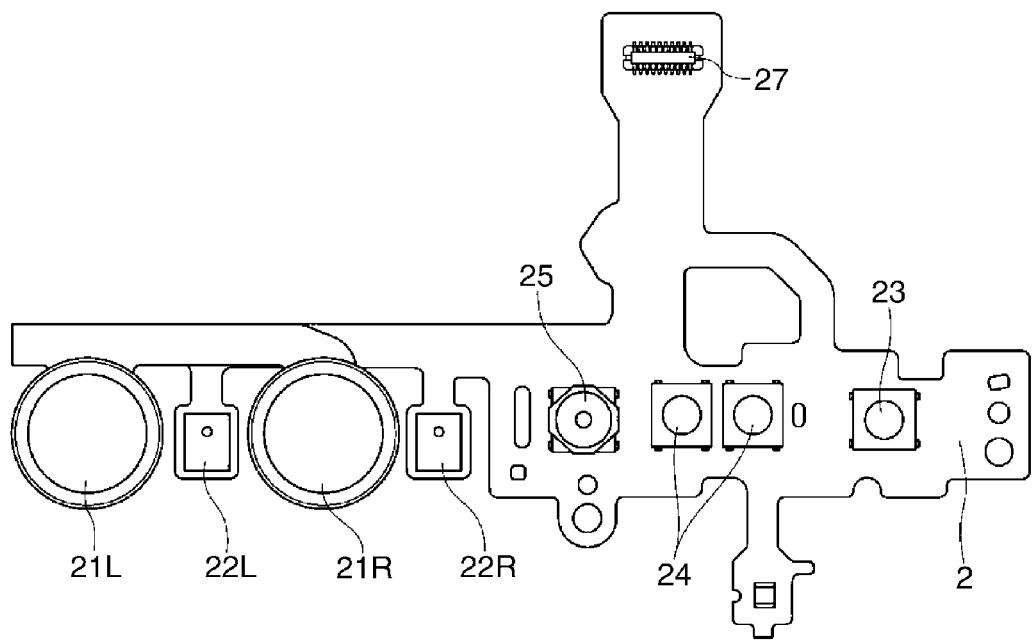
FIG. 12 is a view showing the single-sided flexible wiring board in a state after being folded back.

Next, with reference to FIGS. 11 and 12, a description will be given of a digital camera, which is an electronic device according to a third embodiment of this invention. FIG. 11 shows the FPC 2 in a state before being folded back, and FIG. 12 shows the FPC 2 in a state after being folded back. In the following, only parts different from the first embodiment will be described, while like parts similar to those of the first embodiment are denoted by like numerals, with a description thereof omitted.

In this embodiment, as shown in FIG. 11, before the FPC 2 is folded back, the right speaker 21R, left speaker 21L, left microphone 22L, and right microphone 22R are disposed in this order. In that state, the FPC 2 is folded back at, e.g., a position L2 between a left speaker 21L mounting portion and a left microphone 22L mounting portion of the FPC 2.

As a result, as shown in FIG. 12, the right speaker 21R is disposed between the left and right microphones 22L, 22R, and the left speaker 21L is disposed on the left side of the left microphone 22L. The sound output surfaces of the left and right speaker 21L, 21R and the sound input surfaces of the left and right microphones 22L, 22R are directed to the same direction.

The holding member 4 to which the left and right speakers 21L, 21R and the left and right microphones 22L, 22R are assembled is the same as that in the first embodiment except that a speaker receiving hole into which the left speaker 21L is fitted is additionally formed. This embodiment can also improve the ease of assembling, as compared with a case where the speakers 21L, 21R and the microphones 22L, 22R are assembled to the holding member 4 at a time.

On the FPC 2, the GND signal line 71 is disposed between a plus side signal line 81 for the left speaker 21L and the output signal line 72 for the left microphone 22L. On the side opposite from the output signal line 72 for the left microphone 22L with respect to the GND signal line 71, there are disposed the signal line 81 and a minus side signal line 82 for the left speaker 21L and a plus side signal line 83 and a minus side signal line 84 for the right speaker 21R, whereby noise of the speaker signal is prevented from being superimposed on the output signal of the left microphone 22L. This embodiment is the same as the first embodiment in respect of other constructions, functions, and advantages.

This invention is not limited in construction to the example described in the embodiments, and various changes and modifications may be made in terms of material, shape, size, form, number, installation position, etc. without departing from the spirit and scope of the invention.

For example, in the embodiments, cases have been described where one or two speakers are disposed and two microphones are disposed, but these are not limitative. With this invention, functions and advantages similar to those described in the above can be achieved even in a case where at least one speaker and at least one microphone are disposed.

In the above embodiments, examples have described where the speaker is mounted on the outer side of the fold-back position of the single-sided flexible wiring board, but this is not limitative. The microphones or the speaker and microphones can be mounted on the outer side of the fold-back position.

It should be noted that this invention is applicable to various electronic devices having a speaker and a microphone, other than a digital camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2010-021166 and 2010-022091, filed Feb. 2, 2010 and Feb. 3, 2010, respectively, which are hereby incorporated by reference herein in their entirety.

What is claimed is:

1. An electronic device having a speaker, a microphone, and an exterior member formed with a speaker hole and a microphone hole, comprising: a holding member configured to integrally hold the speaker and the microphone and configured to be fixed to the exterior member so as to dispose the held speaker in alignment with the speaker hole and dispose the held microphone in alignment with the microphone hole; a protrusion portion formed on the holding member and configured to be in close contact with the exterior member when the holding member is fixed to the exterior member, to thereby shield a space connecting the microphone with the microphone hole from another space defined inside of the exterior member; and an elastic member configured to shield a space connecting the speaker with the speaker hole from the other space defined inside of the exterior member when the holding member is fixed to the exterior member, wherein the elastic member is formed separately from the holding member and fixed to the speaker, wherein the protrusion portion of the holding member and the elastic member are pressed so that the elastic member is not contact with the protrusion portion when the holding member is fixed to the exterior member, and wherein the microphone and the speaker are held by the holding member such that a sound input surface of the microphone and a sound output surface of the speaker are directed toward a same direction.

2. The electronic device according to claim 1, wherein the protrusion portion is formed into a double protrusion portion, and a projection protrudingly formed on an inner surface of the exterior member is fitted into a groove formed in the double protrusion portion when the holding member is fixed to the exterior member.

3. The electronic device according to claim 1, wherein the holding member has a hardness different from that of the elastic member.

4. The electronic device according to claim 1, wherein the speaker hole and the microphone hole are formed on a same surface of the exterior member so as to be adjacent to each other, and the speaker and the microphone are disposed adjacent to each other.

5. The electronic device according to claim 4, wherein the microphone is provided two in number, and these two microphone are disposed on opposite sides of the speaker.

6. An electronic device, comprising: a single-sided flexible wiring board configured to be mounted with a speaker, a first microphone and a second microphone; and a holding member having a speaker holding portion for holding the speaker, a first microphone holding portion which holds the first microphone and a second microphone holding portion for holding the second microphone, wherein the single-sided flexible wiring board has a first microphone mounting portion on which the first microphone is mounted, a second microphone mounting portion on which the second microphone is mounted and a speaker mounting portion on which the speaker is mounted, wherein the first microphone mounting portion and the second microphone mounting portions are arranged at one side of a folded back portion, and the speaker mounting portion is arranged at the other side of the folded back portion, wherein the holding member is configured that in a state where the single-sided flexible wiring board is folded back at the folded back portion, the speaker holding portion holds the speaker, the first microphone holding portion holds the first microphone and the second microphone holding portion holds the second microphone, wherein the speaker holding portion of the holding member is disposed between the first microphone holding portion and the second microphone holding portion, wherein the single-sided flexible wiring board has output signal lines for the first microphone and the second microphone, and ground signal lines for the first microphone and the second microphone, wherein one of the output signal lines for the microphones is disposed adjacent to a signal line for the speaker, and wherein one of the ground signal lines for the microphones is disposed between the one of output signal lines and the signal line for the speaker.

7. The electronic device according to claim 6, wherein the single-sided flexible wiring board is mounted with an operation system switch and formed with ground signal lines for the first microphone and the second microphone, and one of the ground signal lines for the microphones is disposed between a signal line of the operation system switch and one of the output signal lines for the first microphone and the second microphone.

8. The electronic device according to claim 6, wherein the single-sided flexible wiring board is formed with a power signal line common to the first microphone and the second microphone.

* * * * *